United States Patent [19]

Copus

[11] Patent Number: 4,924,129

[45] Date of Patent: May 8, 1990

[54] ELECTRICAL BRUSHGEAR

[76] Inventor: Arthur G. Copus, Restharrow, 1B Bernhard Avenue, Blackberry Lane, Four Marks, Alton, Hampshire GU34 5DQ, England

[21] Appl. No.: 224,324

[22] Filed: Jul. 26, 1988

[30] Foreign Application Priority Data

May 6, 1988 [GB] United Kingdom ................. 8810771

[51] Int. Cl.[5] ................................................ H02K 5/14

[52] U.S. Cl. .................................... 310/239; 310/237; 310/248

[58] Field of Search ................................. 310/239–249

[56] References Cited

U.S. PATENT DOCUMENTS

| | | | |
|---|---|---|---|
| 924,804 | 6/1909 | Lowendahl | 310/248 |
| 2,992,344 | 7/1961 | Gillie | 310/246 |
| 3,144,574 | 8/1964 | Henry-Baudot | 310/237 |
| 4,409,508 | 10/1983 | Ooki | 310/239 |
| 4,420,705 | 12/1983 | Kimberlin | 310/242 |
| 4,639,629 | 1/1987 | Casanova | 310/248 |
| 4,746,829 | 5/1988 | Strobl | 310/239 |

FOREIGN PATENT DOCUMENTS

| | | | |
|---|---|---|---|
| 0638216 | 3/1962 | Canada | 310/239 |
| 3123517 | 2/1983 | Fed. Rep. of Germany | 310/239 |
| 0697567 | 11/1965 | Italy | 310/240 |
| 0052349 | 3/1982 | Japan | 310/239 |
| 0936126 | 6/1982 | U.S.S.R. | 310/239 |

*Primary Examiner*—R. Skudy
*Attorney, Agent, or Firm*—Fitch, Even, Tabin & Flannery

[57] ABSTRACT

Electrical brushgear comprises a trapezoidal carbon brush and a frame supporting three sides of the brush, the fourth side of which is supported by a removable clip including a spring exerting a constant pressure on the rear end face of the brush.

10 Claims, 2 Drawing Sheets

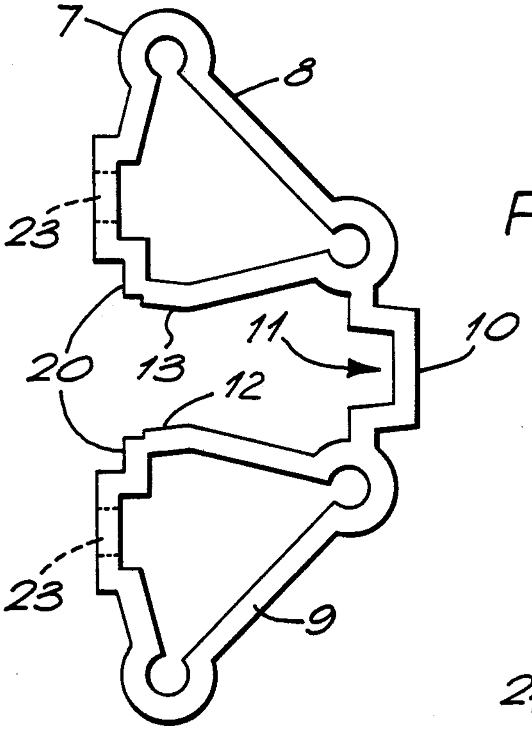
FIG. 3.
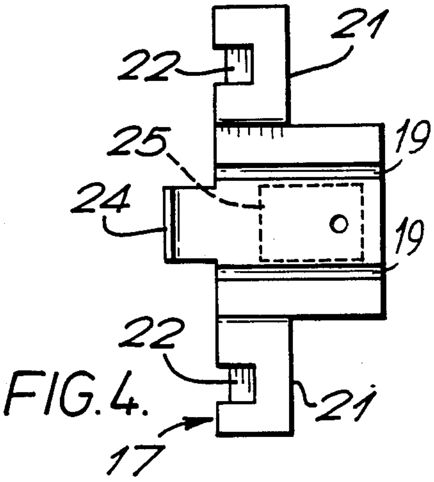
FIG. 4.
FIG. 5.
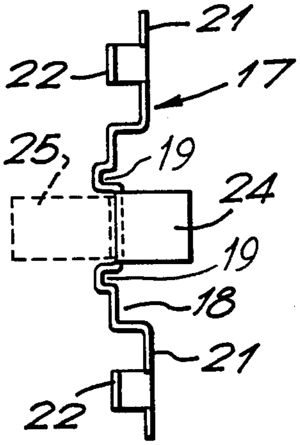
FIG. 6.
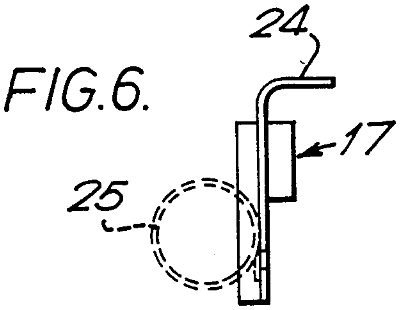

ELECTRICAL BRUSHGEAR

BACKGROUND TO THE INVENTION

This invention relates to electrical brushgear for dynamo-electric machines and particularly to a brush assembly intended for use in a machine wherein the brushes bear axially on commutator segments.

The main object of the invention is to provide an improved assembly in which the brush is removable either axially or radially with respect to the axis of the rotor.

SUMMARY OF THE INVENTION

According to the invention electrical brushgear comprises a brush, a frame supporting the brush against movement in directions corresponding to directions towards a motor axis and peripherally of the motor, and adapted to allow movement of the brush in a first direction away from the motor axis and in a second direction orthogonal to the first direction and axially of the motor, and a clip releasably securable to said frame and adapted to bear on the brush to prevent the said movement away from the axis, the clip including a spring biassing means for engagement with a rear portion of the brush.

According to another aspect, the invention provides brushgear comprising a trapezoidally-sectioned carbon brush, which has a transverse section in the form of a wedge, a frame which supports the brush on three side faces corresponding to the equilateral sides and end of the wedge, and a clip which is releasably securable to the frame and is adapted to support the brush on the fourth side face, the brush being relatively movable lengthwise relative to the frame and clip.

BRIEF DESCRIPTION OF THE DRAWINGS

FIG. 3 is a view of a frame member forming part of the assembly; and FIGS. 4, 5 and 6 are top, end and side views of a clip forming part of the assembly.

DETAILED DESCRIPTION

Figure 1:
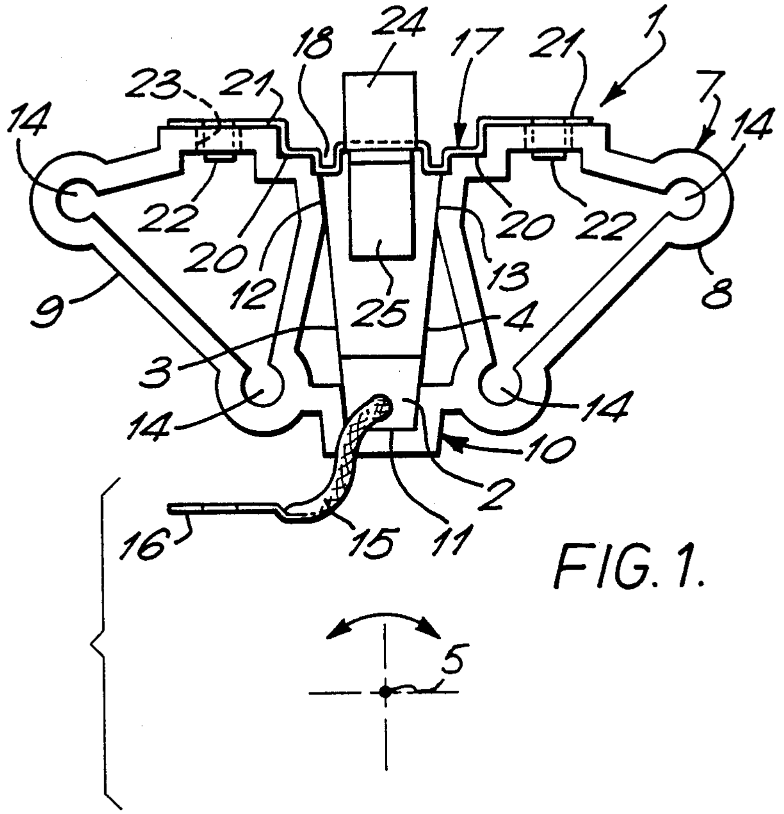
FIG. 1 is an end view of one embodiment of an assembly according to the invention.
Figure 2:
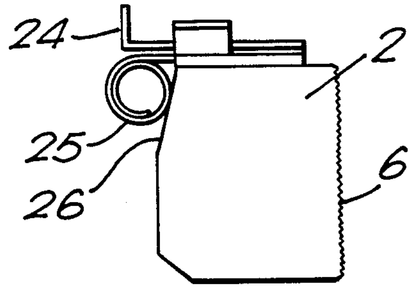
FIG. 2 is a side view of part of the assembly.

The Figures illustrate an assembly 1 by means of which a carbon brush 2 is supported in position relative to the commutator ring of a d.c. motor. In this embodiment the brush is positioned so as to bear on an end face of the commutator. The brush 2 is generally of trapezoid shape, having a section like a truncated wedge and the two radial side faces 3 and 4 are mutually inclined, being in radial planes which intersect at the axis 5 of the machine. The shape provides even wear over the front surface 6 of the brush.

The brush is supported in a frame 7 (shown by itself in FIG. 3) composed of two generally triangular section members 8 and 9 joined by a channel member 10. This member accommodates the bottom of the brush, which fits slidably into the channel 11 in the member 10. The trangular section members each slidably engage and support one each of the sidefaces 3 and 4 of the brush, having mutually tapered wall portions 12 and 13 for this purpose. The frame has at its corners circular recesses 14 which extend throughout the depth of the frame and can each receive a respective supporting pin.

The brush has, extending from its rear face, a braided cable 15 leading to a terminal fitting plate 16.

The frame supports the brush on three sides and allows the brush to be inserted or removed both axially and radially. The fourth side of the brush is supported by a removable clip 17 which is adapted to provide restraint of the brush in the radial direction, by bearing on the top side of the brush, and to provide a spring-bias in the axial direction, to urge the brush into contact with the commutator segments.

The clip 17 (also shown in FIGS. 4, 5 and 6) may be formed from sheet metal and comprises a central channel portion 18 including two downwardly protruding ridges 19 which bear on the top side of the brush. The central portion 18 fits in a channel defined by shoulders 20 on the triangular frame parts. On each side of the central portion the clip has an outer arm 21 in each of which is formed a hook 22. Each hook can engage the rim of a respective aperture 23 in the frame in such manner as to prevent movement of the clip towards the commutator, i.e. in the direction of the arrow in FIG. 3. The clip has an upturned rear lug 24 constituting a handle.

Between the two ridges is mounted a coil 25 of spring strip, anchored at its outer end to the clip. The coil bears on the brush's rear face 26, which is preferably inclined to provide a ramp for the spring. The spring may be a coil spring of ribbon steel sold under the trademark TENSATOR spring, the purpose of which is to exert constant pressure on the electrical brush.

Removal of the clip requires only a slight rearward movement to disengage the hooks; and then an outward lifting movement; the brush may then be removed in a radial or an axial direction. Insertion of a new brush is the reverse process.

The duality of insertion or removal movement of the brush provides in general greater freedom in the arrangement of the machine and greater convenience in maintenance of the machine.

I claim:

1. Electrical brushgear comprising a brush, a frame supporting the brush against movement in directions corresponding to directions towards a motor axis and peripherally of the motor, and adapted to allow movement of the brush in a first direction corresponding to movement away from the motor axis and in a second direction orthogonal to the first direction, said second direction corresponding to movement axially of the motor, and a clip releasably securably securable to said frame and adapted to bear on the brush to prevent the said movement away from the axis, the clip including a spring biassing means for engagement with a rear portion of the brush, said biassing means urging the brush in said second direction.

2. Electrical brushgear according to claim 1 in which the spring biassing means comprises a coil of spring strip positioned to bear on the rear portion of the brush.

3. Electrical brushgear according to claim 2 in which the rear portion provides a ramp for the coil.

4. Electrical brushgear according to claim 1 in which the clip includes a channel portion fitting into a channel defined by the frame.

5. Electrical brushgear according to claim 4 in which the clip has outer arms that include hooks adapted to engage the frame to provide reaction against rearward movement of the brush in said second direction.

6. Electrical brushgear comprising a carbon brush, which has a transverse section in the form of a wedge, a frame which supports the brush on three side faces corresponding to equilateral sides and narrower end of the wedge, and a clip which is releasably securable to the frame and is adapted to support the brush on a fourth side face thereof, the brush being relatively movable lengthways relative to the frame and clip.

7. Electrical brushgear comprising a carbon brush having a front face which is generally flat, for engagement with an end face of a commutator, a rear face generally parallel to and spaced from the front face, first, second, third and fourth side faces, each connecting the front face with said rear face, the first and second side faces being mutually tapered, the third side face joining said first and second side faces and said fourth side face joining said first and second side faces; a frame having abutment means for supporting said brush on said first, second and third side faces, said frame permitting relative movement between the brush and the frame in a first direction normal to said front face of said brush and in a second direction, orthogonal to said first direction, normal to said fourth side face, a clip which is releasably engageable with said frame and includes a portion for engagement with said fourth side face of said brush, said portion restraining movement of said brush in said second direction; and a spring means carried by said clip, positioned for engagement with said rear face, said spring providing urging of said brush in said first direction.

8. Electrical brushgear according to claim 7, wherein said rear face has a ramp portion engaged by said spring.

9. Electrical brushgear according to claim 8, wherein said spring comprises a coil spring for exerting a substantially constant pressure on said brush.

10. Electrical brushgear comprising a brush, a frame supporting the brush against movement in directions corresponding to directions towards a motor axis and peripherally of the motor, and adapted to allow movement of the brush away from the motor axis and axially of the motor, and a clip releasably securable to said frame and adapted to bear on the brush to prevent the said movement away from the axis, the clip including a spring biassing means for engagement with a rear portion of the brush and a channel portion fitting into a channel defined by the frame.

* * * * *

UNITED STATES PATENT AND TRADEMARK OFFICE
CERTIFICATE OF CORRECTION

PATENT NO. : 4,924,129
DATED : May 8, 1990
INVENTOR(S) : Arthur S. Copus

It is certified that error appears in the above-identified patent and that said Letters Patent is hereby corrected as shown below:

Column 1, line 63, change "trangular" to --triangular--.

Column 2, line 49, delete "securably".

Signed and Sealed this

Twenty-fourth Day of December, 1991

*Attest:*

HARRY F. MANBECK, JR.

*Attesting Officer*

*Commissioner of Patents and Trademarks*